(12) United States Patent
Gartstein

(10) Patent No.: US 6,633,790 B2
(45) Date of Patent: Oct. 14, 2003

(54) SYSTEMS AND METHODS FOR OPTIMIZING A PRODUCTION FACILITY

(75) Inventor: Yuri Gartstein, Webster, NY (US)

(73) Assignee: Xerox Corporation, Stamford, CT (US)

(*) Notice: Subject to any disclaimer, the term of this patent is extended or adjusted under 35 U.S.C. 154(b) by 93 days.

(21) Appl. No.: 09/771,740

(22) Filed: Jan. 29, 2001

(65) Prior Publication Data

US 2002/0103559 A1 Aug. 1, 2002

(51) Int. Cl.[7] .............................................. G06F 19/00
(52) U.S. Cl. .................................. 700/99; 700/99
(58) Field of Search ........................... 700/97, 99–103, 700/111, 95; 705/7–9

(56) References Cited

U.S. PATENT DOCUMENTS

| | | | | |
|---|---|---|---|---|
| 4,887,218 A | * | 12/1989 | Natarajan | 364/468 |
| 4,896,269 A | * | 1/1990 | Tong | 364/468 |
| 4,956,784 A | * | 9/1990 | Hadavi et al. | 364/468 |
| 4,974,166 A | * | 11/1990 | Maney et al. | 364/478 |
| 5,093,794 A | * | 3/1992 | Howie et al. | 364/468 |
| 5,229,948 A | * | 7/1993 | Wei et al. | 364/468 |
| 5,918,226 A | | 6/1999 | Tarumi et al. | 707/10 |
| 5,946,661 A | * | 8/1999 | Rothschild et al. | 705/7 |
| 6,263,253 B1 | * | 7/2001 | Yang et al. | 700/99 |
| 6,278,901 B1 | * | 8/2001 | Winner et al. | 700/99 |

OTHER PUBLICATIONS

The American Heritage Dictionary of the English Language 2000, Houghton Mifflin Company, 4th edition.*

The Authoritative Dictionary of IEEE Standards Terms 2000, Standards Information Network IEEE Press, 7th edition, p. 1179.*

Hopp, Wallace J. and Mark L. Spearman, *Factory Physics: Foundations of Manufacturing Management*. McGraw–Hill Professional Book Group, Boston, Massachusetts. ISBN: 0–256–15464–3; pp. 153–156; 323–325; 462–485 (Sep 1995).

Rai, Sudhendu, Xerox Corporation, *Print Shops as Document Factories, The Future of Manfacturing: New Developments in Technology and System Design*; Massachusetts Institute of Technology; Power Point Presentation, Apr. 19, 2000, pp. 1–18.

Gershwin, Stanley and Rai, Sudhendu, *Application and Extension of Manufacturing Systems Engineering Techniques to Print Shops*; Dept. of Mechanical Engineering, Massachusetts Institute of Technology, and Wilson Center for Research Technology, Xerox Corporation; Power Point Presentation; Sep. 29, 1999, pp. 1–15.

Gershwin, Stanley B., *Manufacturing Systems Engineering*, Prentice–Hall, 1994.

*Cellular Manufacturing: One–Piece Flow for Workteams*, ISBN: 156327213X, Productivity Press Inc.; April 1999.

Wu, N., *A Concurrent Approach to Cell Formation and Assignment of Identical Machines in Group Technology*, Int. J. Prod. Res., 1998, vol. 36, No. 8, 2099–2114; Science Center, Shantou University, Shantou 515063, China.

U.S. patent application Ser. No. 09/706,430, Rai et al., filed Nov. 3, 2000.

U.S. patent application Ser. No. 09/767,976, Rai et al., filed Jan. 23, 2001.

U.S. patent application Ser. No. 09/735,167, Jackson et al., filed Dec. 12, 2000.

(List continued on next page.)

*Primary Examiner*—Albert W. Paladini
*Assistant Examiner*—Sean Shechtman
(74) *Attorney, Agent, or Firm*—Fay, Sharpe, Fagan, Minnich & McKee, LLP

(57) ABSTRACT

Systems and methods are provided for optimizing a production facility that includes workstations for producing products. The method involves utilizing an objective function to find optimal production rates of the products.

19 Claims, 3 Drawing Sheets

OTHER PUBLICATIONS

U.S. patent application Ser. No. 09/706,078, Squires et al., filed Nov. 3, 2000.

Luqi, et al., *a Prototyping Language for Real–Time Software*. *IEEE Transactions on Software Engineering*, vol. 14, No. 10, Oct. 1988, pp. 1409–1423.

*ADF or LDF? Introducing the Lean Document Factory I*, Xerox Corporation, Power Point Presentation, Nov. 4, 1999.

*ADF or LDF? Introducing the Lean Document Factory II*, Xerox Corporation, Power Point Presentation, Nov. 4, 1999.

* cited by examiner

SYSTEMS AND METHODS FOR OPTIMIZING A PRODUCTION FACILITY

TECHNICAL FIELD

The present invention relates generally to optimization, and relates specifically to optimization of print shop facilities.

BACKGROUND OF THE INVENTION

Production facilities are frequently faced with problems dealing with multiple job scheduling. When production facilities work on several different products requiring variable processing times on different workstations, optimizing production is not a trivial problem. Such optimization problems are often discussed and approached in terms of job sequencing, which can be an NP-hard problem even using simple formulations. Moreover, typical job sequencing can sometimes miss the advantages that derive from working on several products simultaneously.

SUMMARY OF THE INVENTION

It is an object of the present invention to determine optimal co-production rates for a plurality of products that lead to better overall productivity. Described herein is a method for analyzing a production facility characterized by various processing rates for jobs involved. The method determines which jobs should be co-produced, if any, and at what rates in order to have a maximum benefit. The method is easy to implement because it involves ordinary linear mathematical programming. Because of the simplicity of the method, it can be used dynamically to account for the current state of facility and jobs. In addition, the method of the present invention can be used to determine if a more involved search for optimal sequencing is worthwhile.

In particular, a method for optimizing a production facility is described herein, where the facility has at least one workstation for producing products. For example, at least of the workstations can be a print shop workstation. The method includes finding a bottleneck rate for each product. The bottleneck rate represents the inverse of a maximum effective processing time of the at least one workstation. The method further includes associating a production rate for each product, and computing optimal production rates by utilizing an objective function of the bottleneck rates and the production rates. The at least one workstation may include processing personnel or operators, and/or at least one machine. For example, the at least one workstation can include a machine for manufacturing image forming systems.

In one embodiment of the present invention, the optimal production rates substantially maximize the objective function subject to capacity constraints of the at least one workstation, and the objective function is a linear function of the inverse of the bottleneck rates, and a linear function of the production rates. For example, the objective function can be a sum of products of the production rates and the inverse of the bottleneck rates. Each product may be associated with an optimal production rate computed by utilizing the objective function and the method may further include manufacturing the products at the optimal production rates associated therewith.

The method described herein may be employed dynamically, so that the optimal production rates are re-calculated to reflect a changing status of the facility and of jobs in the facility. For example, a status of the facility can change because of machine failures and repairs, and a status of jobs can change because of job completions and arrivals of new jobs or because of renegotiated due times. A job can be understood as a requirement to produce a certain amount of a specified product by a specified due time or within a certain amount of time.

Also described herein is a production facility that includes at least one workstation for producing products, each product having a bottleneck rate representing the inverse of a maximum effective processing time of the at least one workstation, and a central processor having instructions to input the bottleneck rate of each product, and to output an optimal production rate for each product. The instructions utilize an objective function of the bottleneck rate of each product to output the optimal production rate for each product. Moreover, the instructions can include a subroutine for maximizing the objective function to obtain the optimal production rate for each product subject to capacity constraints of the at least one workstation.

The optimal production rate output by the central processor can influence a production rate of the at least one workstation. The optimal production rates can influence the at least one workstation by, for example, controlling average release rates of different products on the floor of the facility, as in constant-work-in-process (CONWIP) regulated production. The optimal production rates may also influence the at least one workstation by, for example, giving rise to more detailed instructions involving the order in which products should be processed.

Also described herein is a method for optimizing a production facility that produces Np products using Nw workstations, where Np and Nw are natural numbers. The set of natural numbers is the set of integers greater than zero. The method includes finding a bottleneck rate for each of the Np products. The bottleneck rate for product j, $r_{jb}$, where j=1,2, ..., or Np, represents the inverse of a maximum effective processing time of the workstations. The method further includes associating a production rate with each of the Np products, the production rate of product j being denoted by $u_j$, where j=1,2, ..., or Np, and computing optimal production rates by utilizing an objective function of $r_{1b}, r_{2b}, \ldots, r_{Npb}$, and $u_1, u_2, \ldots, U_{Np}$.

In one embodiment of the present invention, the objective function is substantially equal to $\Sigma_j u_j / r_{jb}$, and the optimal production rates substantially maximize the objective function subject to capacity constraints.

Other objective functions can be used. For example, one method of the present invention for optimizing a production facility that produces Np products using Nw workstations, where Np is a whole number greater than one, and Nw is a whole number greater than zero, includes finding a processing time $t_{ji}$ associated with product j and workstation i, for j=1, ..., Np, and i=1, ..., Nw. The method further includes associating a production rate $u_j$ with product j, for j=1,2, ..., Np, and computing optimal production rates by utilizing an objective function of the processing times and the production rates, such as the function given by Equation (4) below.

DETAILED DESCRIPTION OF THE INVENTION

A method is described herein for finding optimal production rates of at least one product in a production facility, such as a print shop facility. The method provides optimal production rates to maximize productivity by allowing workstations to simultaneously work on more than one product in a prescribed fashion. The method may be used dynamically to respond to any changes in the state of the facility and the products, and to direct the production facility to increase or decrease the production rates for different products. The optimal production rates found using the method described herein can help establish useful resource allocation, and/or help to effectively sequence jobs.

Figure 1:
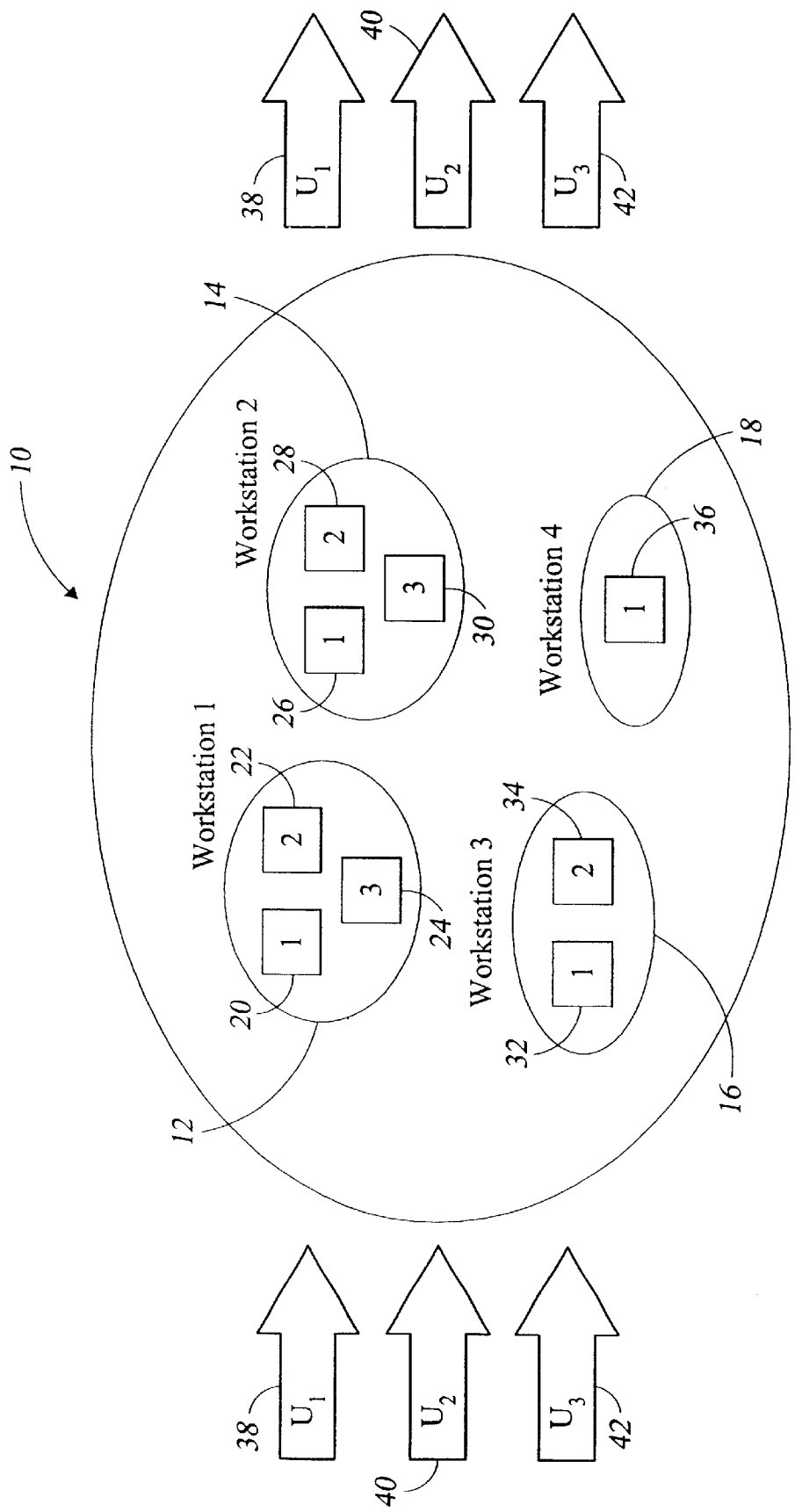
FIG. 1 shows a schematic illustration of an example of a production facility according to the teachings of the present invention.

Referring to FIG. 1, a schematic illustration of an example of a production facility 10 having four workstations 12, 14, 16, and 18 is shown. An example of a production facility 10 is a print shop for printing books. One workstation in this example is responsible for black and white printing, while another workstation is responsible for color printing. A third and fourth workstation bind and wrap the books, respectively. The first workstation 12 includes three machines 20, 22, and 24, the second workstation 14 also includes three machines 26, 28, and 30, the third workstation 16 includes two machines 32 and 34, and the fourth workstation includes one machine 36. In the print shop example, the black and white printing workstation might include three printing machines, either identical or different. Also shown with large arrows are three products 38, 40, and 42 flowing through the production facility 10. In the print shop example, the three products might correspond to three differently titled books.

More generally, a production facility 10 produces Np products using Nw workstations. The term product is used to include goods and/or services. The workstations include machines and/or processing personnel or operators. Product j, where j=1,2, . . . , or Np, requires an effective processing time $t_{ji}$ on workstation i, where i=1,2, . . . or Nw. The effective processing time $t_{ji}$ is an inverse of a corresponding rate, and coincides with the true processing time, $t0_{ji}$, of a single machine in workstation i if the workstation i has only one machine. More generally, the effective processing time $t_{ji}$ is a fraction of a processing time of a single machine. For example, if workstation i has n≧1 identical machines, then the effective processing time $t_{ji}$ is equal to $t0_{ji}/n$. The time $t_{ji}=0$ if job j does not require processing on workstation i. The set of all effective processing times for a particular job j, having Nw members, is denoted by $T_j$.

For each workstation i of the production facility, where i=1, . . . , or Nw, to completely process $n_1$ units of product 1, $n_2$ units of product 2, . . . , and $n_{Np}$ units of product Np requires an amount of time no smaller than $\Sigma_j n_j t_{ji}$; hence, if in some time t such a quantity of units are produced then $$t \geq \Sigma_j n_j t_{ji} \quad (1)$$

The last expression becomes an equality for a particular i only if all of the machines in workstation i work at maximum capacity, i.e., they are in continuous operation. It is convenient to divide Expression (1) by t to obtain $$\Sigma_j u_j t_{ji} \geq 1, \text{ for } i=1, \ldots, Nw \quad (2)$$

where the production rate $u_j$ is defined to be $n_j/t$, the number of units of job j produced, on the average, by the production facility per unit time. From the definition, $$u_j \geq 0 \quad (3)$$

valid for all j=1, . . . , Np.

The bottleneck time $t_{jb}$ for a particular product j is the largest member of the set $T_j$:

$$t_{jb} = \max T_j$$

The inverse of the bottleneck time $t_{jb}$ is the bottleneck rate and is denoted by $r_{jb}=1/t_{jb}$. Product j cannot be produced with a rate that is larger than the bottleneck rate $r_{jb}$.

The production facility can produce products separately. As used in this context, if the facility produces products separately, then the facility works continuously, but only on one product at a time. The maximum possible production rate for that product is the corresponding bottleneck rate, e.g. $u_j=r_{jb}$ for product j. If workstations of the facility are not fully balanced for production of this product, then even at that highest production rate, some of the workstations are not fully utilized and work only part of the time. (Only the bottleneck workstations are fully utilized, i.e., work full time.) Better overall utilization and productivity could be achieved if the facility works on more than one product simultaneously and those products have different patterns of processing imbalance, e.g. different bottleneck workstations. As used in this context, "simultaneously" means that while some workstation(s) process one product, the same or other workstation(s) process another product or products. Production of more than one product simultaneously could mean that none of the products is produced at their individual maximum possible rate. The aggregated production of "all" products can benefit from the simultaneous processing.

Optimal operation regimes are found by maximizing a corresponding objective function $P(u_1, \ldots, u_{Np})$ through the variation of the production rates of different products. The objective function may also depend on various parameters and reflect specific requirements. The objective function is related to the overall productivity and/or equipment utilization of a facility processing different products simultaneously. A useful class of objective functions which is linear of the production rates $u_j$ is $$P(u_1, \ldots, u_{Np}) = \Sigma_j u_j f(T_j) \quad (4)$$

where f is a function of the set of effective processing times. A particular member of the class of functions (4) that is considered herein is $$P = \Sigma_j u_j / r_{jb} \quad (5)$$

which is a sum of normalized production rates for all products, or an "overall output rate." The objective function (5) is related to the total time required to produce a certain amount of products, as shown and explained below. Evidently, if only one of the products (any if them) is produced, then the objective function in Eq. (5) P=1. For a mix of products, however, P can be made larger than 1. To optimize the production facility, the production rates, $u_j$, are varied to maximize the objective function P given by Equation (5), subject to constraints (2) and (3). The production rates that maximize the objective function are the optimal production rates. By allowing the facility to produce products at the optimal production rates, the facility takes advantage of positive interference that may exist between different products.

It should be emphasized that the particular objective function given by Equation (5) is only one example of a number of different objective functions that can be used to obtain optimal production rates to achieve various specific goals. For example, the utilization degree of workstation i is given by $\Sigma_j u_j t_{ji}$, which varies from 0 to 1. If "importance" weights are introduced $0<w_i<1$, an objective function can be constructed as $P=\Sigma_i w_i \Sigma_j u_j t_{ji}$. Maximizing the latter with predefined weights $w_i$ results in better utilization of certain workstations with larger weights. Also, added or different constraints may also be utilized, as discussed below.

The following examples help illustrate the method of optimizing a production facility according to the aforementioned principles utilizing the objective function of Equation (5).

EXAMPLE A

One example involves the production of two products in a production facility having two workstations with effective processing times (in some time units)

$$T_1=\{1, 2\} \text{ and } T_2=\{2, 1\}.$$

In this example, the bottleneck rate for both products is 0.5. The maximum of P=4/3 is achieved for equal production rates $u_1=u_2=1/3$ with both workstations fully utilized, as opposed to partial utilization if the products were produced separately.

EXAMPLE B

Another example involves three products in a production facility having four workstations with effective processing times $$T_1=\{2, 1, 1.2, 0.8\}, T_2=\{1.9, 1.5, 1, 2.2\}, \text{ and } T_3=\{0.8, 2.3, 2.5, 0.1\}.$$

Optimization now yields approximately P=1.41 achieved at $u_1=0.24$, $u_2=0.18$, and $u_3=0.21$. Here, simultaneous production results in a 40% increase in overall productivity when the products are processed together at the found rates. Thus, if the facility works 100 time units, it produces 24 units of product 1, 18 units if product 2, and 21 units of product 3. To produce the same quantities separately would take 24*2.0+18*2.2+21*2.5=140 time units. If T3 is replaced with {2.4, 1.6, 1, 2}, then optimization gives $u_1=0.1$, $u_2=0.42$, and $u_3=0$ with P=1.13. In this case, maximum benefit (13%) is achieved when only products 1 and 2 are run together with product 3 not produced, or produced later under different conditions.

In the example above, the output rates were optimized without considering another possible constraint of how many units of those products are needed. If such constraints were in place, then the solution above would work only until either of the products is produced in the required quantity. The optimization should then be repeated with the finished product removed from consideration. And so on.

More general, and perhaps more frequently used, forms of constraint (3) are $$u_j \geq u_{j0} \tag{3a}$$

or $$u_j = u_{j0} \tag{3b}$$

indicating that production of product j cannot fall below a certain rate (to meet deadlines) or should be maintained at a predetermined level (to meet some other requirements).

Thus, in Example B, if an additional requirement is that product 2 should be produced at rate $u_2=0.3$, then optimization results in $u_1=0.14$ and $u_2=0.18$ with P=1.39. Although P has not changed much from 1.41, the prescribed rates have.

If the equipment utilization should be not more than a certain percentage of time (to allow for maintenance, for example), the right hand side of Eq. (2) is the corresponding fraction of time, $0<a_i<1$ for workstation i. That is, $$\Sigma_j u_j t_{ji} \leq a_i, \text{ for } i=1, \ldots, N_W \tag{2a}$$

"Macroscopic" production rates found by this approach are average (long-time scale) production rates and they can be realized in many different ways with different "microscopic" (short-time scale) control policies that would reflect other considerations and detailed conditions.

Example A Revisited

The optimal production rates for products 1 and 2 were found to be equal. If both workstations in this example consist of one machine, the actual microscopic production of products could, for example, be sequenced like in leveled "just-in-time" production, 12121212 (alternatively processing one unit of each product). Or it could be done in batches consisting of several units of each product, for example, 11111222211112222. (Batching becomes a necessity when setup times are non-zero.) Moreover, as discussed below, this scheme in principle allows the batches to be as big as the whole job.

If both workstations consist of 3 machines, then a new, and probably preferable, realization can occur when units of both products are processed not alternatingly, but in parallel, with one machine from workstation 1, and two machines from workstation 2 working on product 1, and the rest of the machines working on product 2.

The alternating sequence of small job pieces frequently, but not always, makes a more conventional problem of the whole job sequencing irrelevant. However, when jobs are not allowed (formally or for some real reason) to be mixed at the level of smaller pieces, the systems and methods of the present invention can help decide if a more involved sequencing study is worthwhile and, if so, which subsets of jobs to consider.

The systems and method of the present invention help decide if it is better to work on some jobs "simultaneously." If the answer is positive, signifying a possibility of "positive interference" between jobs, then the jobs with non-zero optimal production rates can be sequenced so that while one job is not finished, another one can be started. The systems and methods of the present invention first identify the most beneficial job combinations. The process can then be repeated with those jobs removed to find the next best subset of jobs, if any, and so on. This can significantly decrease the difficulty of the resulting sequencing problems. It should also be noted that pure sequencing may not always take the full advantage of co-production if other control policies, such as "constant work in process" (CONWIP) that restricts the overall amount of "work in process" (WIP) in the facility, are in place. If the answer is negative, when no improvements are expected from running jobs simultaneously (this usually happens when jobs have the same bottleneck workstation), no sequencing would help to improve the overall productivity.

Example A Revisited

In this example, a good sequencing of the two jobs is that product 1 is produced first followed by product 2, so that job 2 is processed on workstation 1 while job 1 is still on workstation 2 ("simultaneous" processing).

The computation of the optimal production rates using the objective function given by Equations (4) or (5) can be performed using linear mathematical algorithms, such as simplex method known to those of ordinary skill in the art. An example of a commercial subroutine employing such methods is the LINPROG function of the PV-WAVE package from Visual Numerics™, Inc. Another example is Microsoft Excel™ Solver. The systems and methods of the present invention are simple enough to admit the dynamic processing that permits responses to changing conditions, like job arrivals and completions, failures and repairs of the equipment, changning deadlines, and even incorrect estimates of the input parameters (in the spirit of feedback control).

Figure 2:
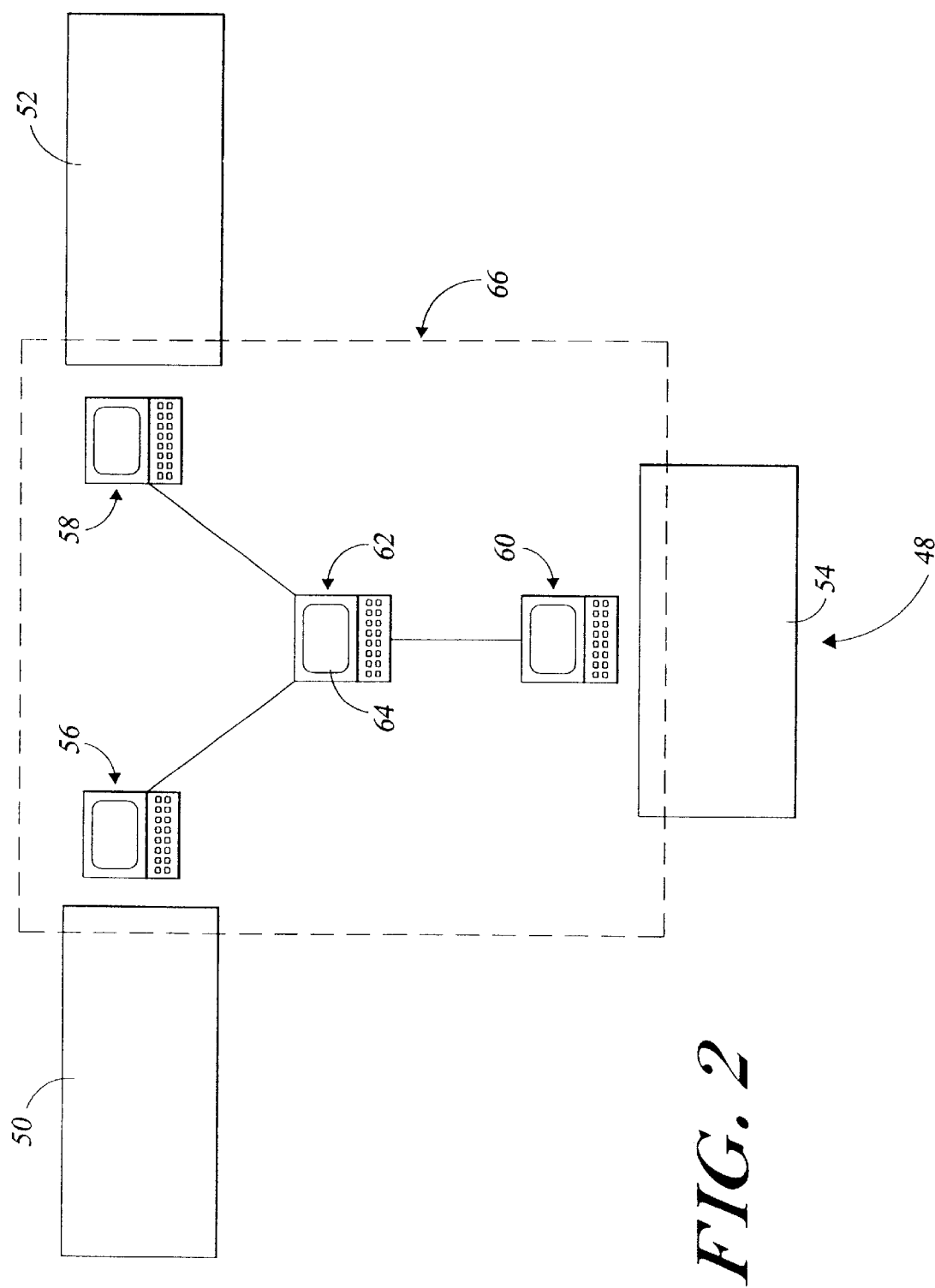
FIG. 2 shows an example of a computer system for implementing a method for optimizing a production facility.

The method of the present invention can be implemented on several computer systems. Referring to FIG. 2, an example of a computer system for implementing the method is shown. Each of three workstations 50, 52, and 54 in the production facility 48, that are used to produce two products (not shown), can include a computer 56, 58, and 60. Each of the computers 56, 58, and 60 can be connected to a central processor 62 having a monitor 64. The central processor 62 is shown residing remotely, but could also reside within one of the workstations 50, 52, and 54. The computers 56, 58, and 60 in each of the workstations 50, 52, and 54 and the central processor 62 can be connected via a local area network (LAN) 66. A method for maximizing the objective function (5) can be stored in the processor 62.

The method takes as input the set of bottleneck rates (or the set of effective processing times, if Equation (4) is used instead of Equation (5)), for the three workstations 50, 52, and 54, and outputs the optimal production rates for the two products produced by the facility 48. The set of bottleneck times can be input into the central processor 62 by facility personnel using the monitor 64. Instead, the set of bottleneck times can be computed by the computers 56, 58, and 60 and automatically sent by these computers to the central processor 62 via the LAN 66. The output of optimal production rates can be used to allow facility personnel to adjust the workstations 50, 52, and 54 accordingly. Instead, the output can be processed by the central processor 62 to automatically issue commands by the central processor 62 to the computers 56, 58, and 60. Such commands can influence the workstations 50, 52, and 54 to produce products at rates consistent with the computed optimal production rates.

Figure 3:
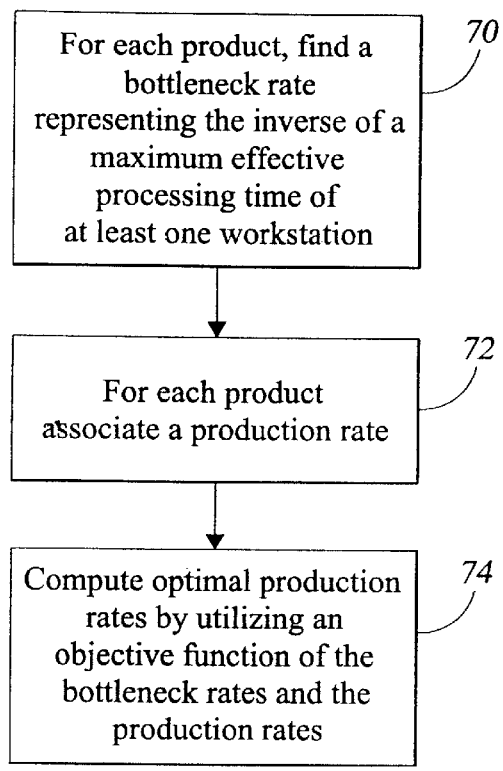
FIGS. 3 and 4 show flow charts having steps for optimizing a production facility.

Referring to FIG. 3, a flow chart is presented indicating steps for optimizing a production facility having at least one workstation for producing products. In step 70, for each product, a bottleneck rate is found representing the inverse of a maximum effective processing time of the at least one workstation. In step 72, a production rate is associated with each product. Subsequently, in step 74, optimal production rates are computed by utilizing an objective function of the bottleneck rates and the production rates.

Figure 4:
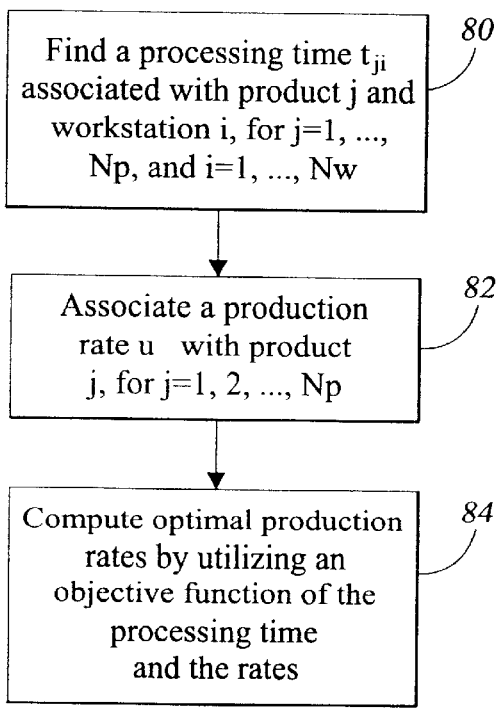

Referring to FIG. 4, a flow chart is presented indicating steps for optimizing a production facility that produces Np products using Nw workstations, where Np is a whole number greater than one, and Nw is a whole number greater than zero. In step 80, a processing time $t_{ji}$ is found associated with product j and workstation i, for j=1, . . . , Np, and i=1, . . . , Nw. In step 82, a production rate $u_j$ is associated with product j, for j=1,2, . . . , Np. Subsequently, in step 84, optimal production rates are computed by utilizing an objective function of the processing times and the production rates, such as the function given by equation (4) above.

What is claimed:

1. A method for optimizing a production facility having a plurality of workstations for producing products, the method comprising the steps of for each product, finding a bottleneck rate representing the inverse of a maximum effective processing time of one of workstations of the plurality of workstations;

for each product, associating a production rate; and computing optimal production rates for the plurality of workstations by utilizing an objective function of the bottleneck rates and the production rates.

2. The method of claim 1, wherein, in the step of computing, the optimal production rates substantially maximize the objective function.

3. The method of claim 2, wherein, in the step of computing, the objective function is substantially maximized subject to capacity constraints of the at least one workstation.

4. The method of claim 1, wherein, in the step of computing, the objective function of the bottleneck rates and the production rates is a linear function of the inverse of the bottleneck rates.

5. The method of claim 1, wherein, in the step of computing, the objective function of the bottleneck rates and the production rates is a linear function of the production rates.

6. The method of claim 1, wherein, in the step of computing, the objective function is a sum of products of the production rates and the inverse of the bottleneck rates.

7. The method of claim 1, wherein, in the step of finding, the at least one workstation is a print shop workstation.

8. The method of claim 1, wherein, in the step of finding, the at least one workstation includes at least one machine or processing operator.

9. The method of claim 1, wherein, in the step of finding, the at least one workstation includes a machine for manufacturing image forming systems.

10. The method of claim 1, wherein, in the step of computing, each product is associated with an optimal production rate computed by utilizing the objective function.

11. The method of claim 10, further comprising manufacturing the products at the optimal production rates associated therewith.

12. The method of claim 1, further comprising re-calculating optimal production rates to reflect a changing status of the facility and of jobs in the facility.

13. A production facility comprising a) at least one workstation for producing products, each product having a bottleneck rate representing the inverse of a maximum effective processing time of the at least one workstation; and b) a central processor having instructions to input the bottleneck rate of each product, and to output an optimal production rate for each product; wherein the instructions utilize an objective function of the bottleneck rate of each product to output the optimal production rate for each product.

14. The production facility of claim 13, wherein the optimal production rate output by the central processor influences a production rate of the at least one workstation.

15. The production facility of claim 13, wherein the instructions include a subroutine for maximizing the objective function to obtain the optimal production rate for each product.

16. The production facility of claim 13, wherein the instructions include a subroutine for maximizing the objective function to obtain the optimal production rate for each product subject to capacity constraints of the at least one workstation.

17. A method for optimizing a production facility that produces Np products using Nw workstations, where Np and Nw are natural numbers, the method comprising the steps of:

for each of the Np products, finding a bottleneck rate representing the inverse of a maximum effective processing time of the Nw workstations, the bottleneck rate of product j being denoted by $r_{jb}$, where j=1,2, . . . , or Np;

for each of the Np products, associating a production rate, the production rate of product j being denoted by $u_j$, where j=1,2, . . . , or Np; and computing optimal production rates by utilizing an objective function of $r_{1b}, r_{2b}, \ldots, r_{Npb}$, and $u_1, u_2, \ldots, u_{Np}$.

18. The method of claim 17, wherein, in the step of computing, the objective function is substantially equal to $\Sigma_j u_j/r_{jb}$.

19. The method of claim 18, wherein the optimal production rates substantially maximize the objective function subject to capacity constraints.

* * * * *